United States Patent [19]

Haze

[11] Patent Number: 4,645,020

[45] Date of Patent: Feb. 24, 1987

[54] COMBINATORIAL WEIGHING MACHINE WITH WEIGHING AND COUNTING MODES

[75] Inventor: Setsuo Haze, Shiga, Japan

[73] Assignee: Ishida Scales Mfg. Co., Ltd., Kyoto, Japan

[21] Appl. No.: 726,981

[22] Filed: Apr. 25, 1985

[30] Foreign Application Priority Data

Apr. 26, 1984 [JP] Japan ................. 59-084635

[51] Int. Cl.$^4$ ............................. G01G 19/22
[52] U.S. Cl. ............................. 177/25; 177/1
[58] Field of Search ........................ 177/1, 25

[56] References Cited

U.S. PATENT DOCUMENTS

| | | | |
|---|---|---|---|
| 4,396,078 | 8/1983 | Minamida et al. | 177/1 |
| 4,398,612 | 8/1983 | Mikami et al. | 177/25 |
| 4,466,499 | 8/1984 | Minamida et al. | 177/1 |
| 4,522,274 | 6/1985 | Konishi et al. | |
| 4,549,278 | 10/1985 | Minamida et al. | 177/25 X |
| 4,549,617 | 10/1985 | Matsumoto et al. | 177/25 X |
| 4,566,070 | 1/1986 | Tanaka | |

FOREIGN PATENT DOCUMENTS

| | | |
|---|---|---|
| 0043678 | 1/1982 | European Pat. Off. |
| 0075489 | 3/1983 | European Pat. Off. |
| 0074269 | 3/1983 | European Pat. Off. |
| 57-231652 | 7/1984 | Japan . |
| 2098422 | 11/1982 | United Kingdom . |
| 2100866 | 1/1983 | United Kingdom . |

Primary Examiner—George H. Miller, Jr.
Attorney, Agent, or Firm—Staas & Halsey

[57] ABSTRACT

An automatic weighing machine for combinatorial weighing has weighing and counting modes and operates to effect the combinatorial arithmetic operation in the weighing mode when a preset count set by a number setting unit is zero, and to effect the combinatorial arithmetic operation in the counting mode when the preset count set by said number setting unit is other than zero.

16 Claims, 3 Drawing Figures

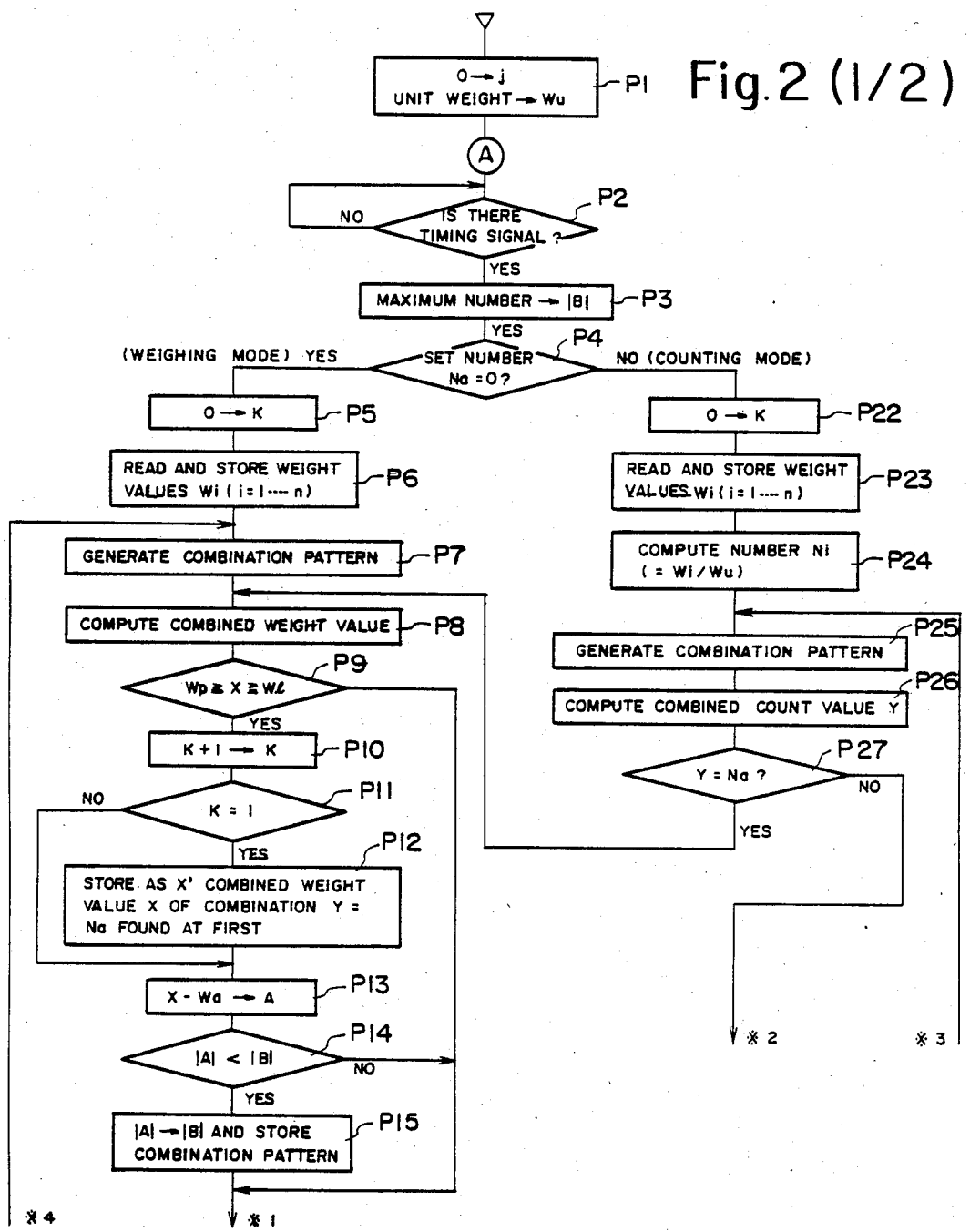
Fig. 2 (1/2)

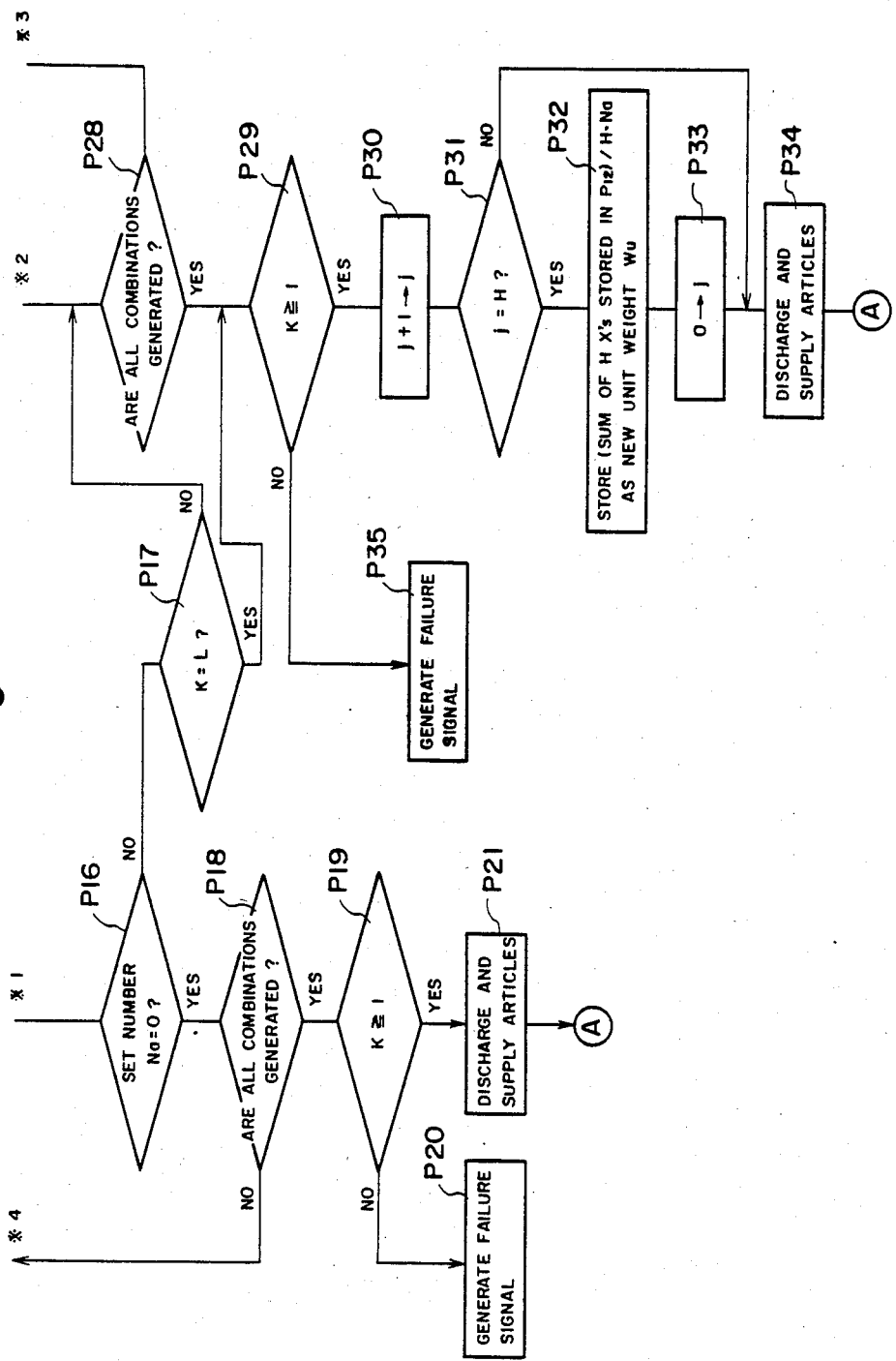
Fig. 2 (2/2)

COMBINATORIAL WEIGHING MACHINE WITH WEIGHING AND COUNTING MODES

CROSS-REFERENCE TO RELATED APPLICATIONS

This application is related to U.S. application Ser. Nos. 415,751, filed Sept. 7, 1982; 439,595, field Nov. 5, 1982; and 419,924, filed Sept. 20, 1982, now U.S. Pat. No. 4,466,499, all of which are assigned to the Assignee of the subject application.

BACKGROUND OF THE INVENTION

The present invention relates to an automatic weighing machine capable of automatically switching between a weighing mode and a counting mode for finding a combination of articles having a desired total weight or count.

There has been put to use an automatic weighing machine having a plurality of weighing machines or units for measuring the weights of articles charged in the weighing units. The measured weights are supplied to an arithmetic control unit comprising a microcomputer, for example, in which the measured weights are combined and the weight combinations are compared with a preset weight value to find an optimum combination of weights which is equal to the preset weight value or closet to the preset weight value within the range between upper and lower weight limits. The articles are then discharegd from those weighing units which are selected as giving the optimum combination of weights.

Another known automatic weighing machine operates by measuring the weights of the articles charged in the weighing units, and supplying the measured weights to the arithmetic control unit. The arithmetic control unit then divides the weights by the average weight of an article (hereinafter referred to as a "unit weight") to compute the number or counts of the articles. The counts are then combined and the count combinations are compared with a preset count to find an optimum combination of counts which is equal to the preset count or closet to the preset count within the range between upper and lower count limits. The articles are then discharged from those weighing units which are selected as giving the optimum combination of counts. The automatic weighing machine employing the above counting process updates the unit weight each time the weighing cycle is completed, thereby increasing the accuracy of weighing.

The assigne of the subject application has filed Japanese Patent Application No. 57-231652 disclosing an automatic weighing machine in which one of weighing and counting modes is selected dependent on the articles charged in the weighing units, and a combination of articles is found and discharged which gives an optimum combination of weights or counts.

With the conventional automatic weighing machines having such two selectable modes, the switching between the weighing and counting modes is effected manually by a selector switch. The manual operation of the selector switch is disadvantageous in that it is tedious to operate the switch, and mode switching is not reliable because the operator may forget to operate the switch. Further, the process in the counting mode is time-consuming since the unit weight is updated each time the weighing cycle is completed.

SUMMARY OF THE INVENTION

It is an object of the present invention to provide an automatic weighing machine having weighing and counting modes automatically switchable to allow the automatic weighing machine to be controlled with ease.

Another object of the present invention is to provide an automatic weighing machine in which the combinatorial arithmetic operation in a counting mode can rapidly be carried out.

Still another object of the present invention is to provide an automatic weighing machine in which the unit weight is updated in a counting mode each time the articles are discharged in a number of consecutive cycles for thereby speeding up the weighing process.

According to the present invention, there is provided an automatic weighing machine for combinatorial weighing in weighing and counting modes, comprising a plurality of weighing units for measuring the weights of supplied articles and issuing data corresponding to the weights, an arithmetic control unit for effecting a combinatorial arithmetic operation on the data from the weighing units, a weight setting unit for supplying a preset weight value to the arithmetic control unit, a number setting unit for supplying a preset count to the arithmetic control unit, and a unit weight setting unit for supplying the average weight of an article to the arithmetic control unit, the arithmetic control unit being operable to effect the combinatorial arithmetic operation in the weighing mode when the preset count set by the number setting unit is zero, and to effect the combinatorial arithmetic operation in the counting mode when the preset count set by the number setting unit is other than zero.

According to the present invention, there is also provided an automatic weighing machine wherein when the preset count set by the number setting unit is other than zero, the arithmetic control unit divides the weight data from the weighing units by the average weight of an article set by the unit weight setting unit to produce the number of articles per weighing unit, computes combined count values based on the numbers of articles of the respective weighing units, and selects an optimum article combination having the combined count value equal to the preset count. The number of optimum article combinations having combined weight values within a preset range is limited to a predetermined number. The arithmetic control unit discharges the articles from those weighing units which give the selected article combination.

According to the present invention, there is also provided an automatic weighing machine wherein when the preset count set by the number setting unit is other than zero, the arithmetic control unit divides the data of weights from the weighing units by the average weight of an article set by the unit weight setting unit to produce the number of articles per weighing unit, computes combined count values based on the numbers of articles of the respective weighing units, compares the computed combined count values with the preset count to select an optimum article combination, discharges the articles from those weighing units which give the selected article combination, and updates the average weight each time the articles are discharged a prescribed number of times.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a flowchart of the operation of the automatic weighing machine shown in FIG. 1.

DESCRIPTION OF THE PREFERRED EMBODIMENT

Figure 1:
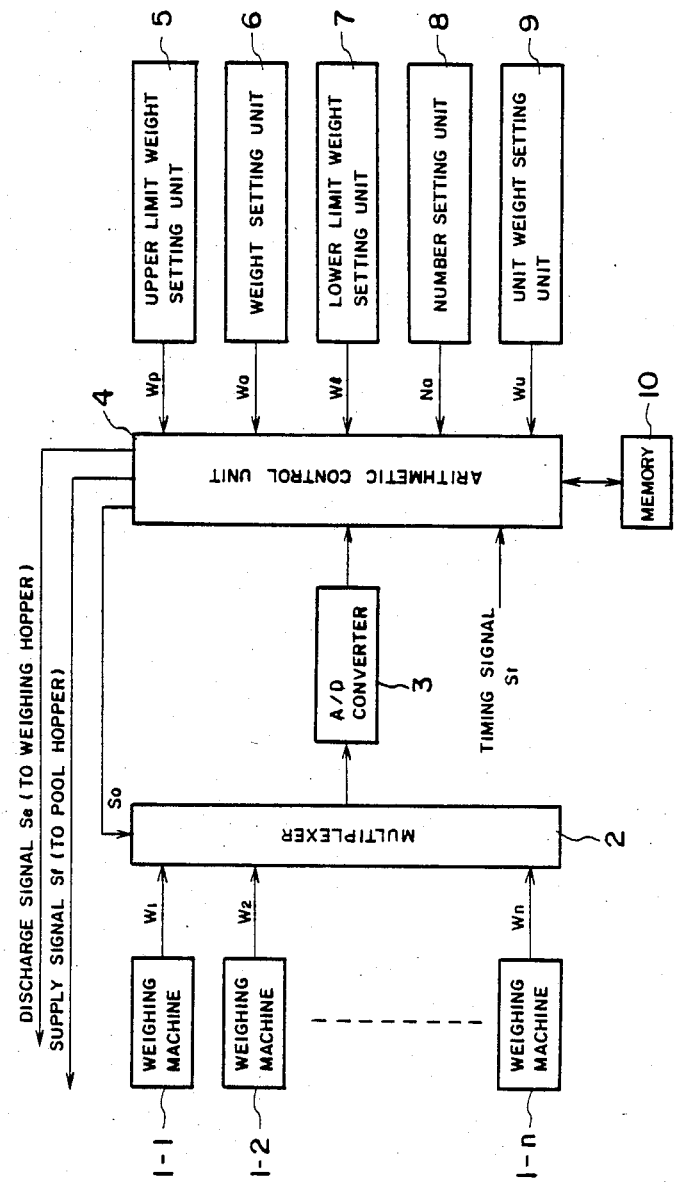
FIG. 1 is a block diagram of an automatic weighing machine according to the present invention.

FIG. 1 is a block diagram of an automatic weighing machine according to the present invention. The automatic weighing machine is composed of a plurality of weighing machines or units 1-1, 1-2, ..., 1-n for measuring the weights of articles supplied thereto and issuing analog weight data W1, W2, ..., Wn. The weight data W1, W2, ..., Wn from the weighing units are applied to a multiplexer 2 which successively issues the applied weight data W1, W2, ..., Wn, one by one, in response to a switching signal So from an arithmetic control unit 4. The multiplexer 2 comprises an analog switch, for example. The weight data W1, W2, ..., Wn sequentially delivered from the multiplexer 2, are converted by an A/D converter 3 into digital data which are supplied to the arithmetic control unit 4 composed of a microcomputer, for example. The arithmetic control unit 4 then effects a combinatorial arithmetic operation and other various arithmetic operations on the supplied data. A memory 10 includes various memories such as a program memory storing a control program for controlling the arithmetic operations executed by the arithmetic control unit 4, and a working memory, for example. The automatic weighing machine also includes an upper limit weight setting unit 5 for setting and supplying an upper limit weight Wp to the arithmetic control unit 4, a weight setting unit 6 for setting and supplying a target weight or preset weight Wa to the arithmetic control unit 4, a lower limit weight setting unit 7 for setting and supplying a lower limit weight Wl to the arithmetic control unit 4, a number setting unit 8 for setting and supplying a preset number or count Na to the arithmetic control unit 4, and a unit weight setting unit 9 for setting and supplying the average weight of an article (unit weight) to the arithmetic control unit 4. When the arithmetic control unit 4 is to be operated in a weighing mode, the number setting unit 8 is set to "0".

Operation of the automatic weighing unit thus constructed is as follows:

If the arithmetic control unit 4 is to be operated in the weighing mode, then the number setting unit 8 is set to "0" by the operator. When the automatic weighing machine is set to the weighing mode and a timing signal St from a packaging machine (not shown) is supplied to the arithmetic control unit 4, the arithmetic control unit 4 delivers the switching signal So to the multiplexer 2 to enable the multiplexer 2 to successively receive signals representing the weights Wl through Wn of the articles weighed by the weighing units 1-1 through 1-n. The weight signals are then successively delivered from the multiplexer 2 and converted by the A/D converter 3 into digital values which are applied to the arithmetic control unit 4.

The arithmetic control unit 4 is controlled by the program stored in the program memory in the memory 10 for successively generating $(2^n - 1)$ combination patterns (n is the number of weighing units) and computing combined weight values based on the combination patterns. Then, the arithmetic control unit 4 compares the combined weight values with the preset weight Wa, and finds an article combination giving an optimum weight combination equal to the preset weight Wa or close to the preset weight Wa in the range between the upper limit weight Wp set by the upper limit weight setting unit 5 and the lower limit weight Wl set by the lower limit weight setting unit 7. The arithmetic control unit 4 then supplies a discharge signal Se to the weighing hoppers of those weighing units which give the article combination thus found, for thereby discharging the articles from those weighing units. The arithmetic control unit 4 also supplies a supply signal Sf to the pool hoppers of the weighing units from which the articles have been discharged, for thereby controlling the supply of the articles to the weighing hoppers.

When a prescribed number or target count is set in the number setting unit 8, the automatic weighing machine operates in a counting mode. In the counting mode, the arithmetic control unit 4 divides the weights by a unit weight signal Wu initially set by the unit weight setting unit 9 to convert the weights into numbers or counts of the articles, which are combined for a combinatorial arithmetic operation to be effected on the counts. The arithmetic control unit 4 then computes count combinations based on combination patterns, and compares the count combinations with the target count Na set by the number setting unit 8. The arithmetic control unit 4 finds an article combination giving a count combination equal to the target count and also giving a weight combination equal to the target weight or closest thereto within a preset allowable range, and then selects those weighing units which give such an article combination. The arithmetic control unit 4 then supplies the discharge signal Se to the weighing hoppers of the selected weighing units and also supplies the supply signal Sf to the pool hoppers of the selected weighing units.

FIG. 2 is a flowchart of the operation of the automatic weighing machine of the present invention. The operation of the automatic weighing machine will now be described with reference to FIG. 2.

(1) The arithmetic control unit 4 initializes a discharge count j to "0", the discharge count j being counted up each time the articles are discharged in the count mode, and also initializes the unit weight Wu to the value set in the unit weight setting unit 9 in a step $P_1$. Then, the arithmetic control unit 4 checks if there is a timing signal St from the packaging machine in a step $P_2$. After a maximum storable number is set in $|B|$ in a step $P_3$, the arithmetic control unit 4 ascertains whether the preset count Na is 0 or not in a step $P_4$. If Na=0, then the program proceeds to the weighing mode.

(2) The arithmetic control unit 4 sets an index K to "0" in a step $P_5$, and reads the weight values Wi (i=1, ..., n) of the weighing units and stores the weight values in the memory 10 in a step $P_6$. Then, the arithmetic control unit 4 generates a combination pattern under the control of the program stored in the program memory in the memory 10 in a step $P_7$, and computes a combined weight value X based on the weight values Wi in a step $P_8$. The arithmetic control unit 4 ascertains in a step $P_9$ if the combined weight value X meets the condition $Wp \geq X \geq Wl$ where is the upper limit weight value $W_p$ and Wl is the lower limit weight value.

(3) If the above condition is met in the step $P_9$, then the arithmetic control unit 4 increments K by 1 in a step $P_{10}$. If K is determined to be 1 in a step $P_{11}$, then the combined weight value X which is found at first as meeting the condition of the step $P_9$ in the weighing mode, or the combined weight value X giving an article combination with its combined total count Y found at first as being equal to the set count Na set by the number setting unit 8 in the counting mode, is stored as X' in the memory 10 in a step $P_{12}$. Thereafter, the arithmetic control unit 4 determines the difference A between the combined weight value X and the preset weight value Wa set by the weight setting unit 6 in a step $P_{13}$.

Then, the arithmetic control unit 4 compares in a step $P_{14}$ the difference $|A|$ determined in the step $P_{13}$ with the number set in $|B|$ in the step $P_3$. If $|A| < |B|$, then $|A| \rightarrow |B|$, and the combination pattern generated in the step $P_7$ are stored in the memory 10 in a step $P_{15}$.

(4) The arithmetic control unit 4 ascertains again whether the preset count Na set by the number setting unit 8 is 0 or not in a step $P_{16}$, and checks if the process has been completed for all combinations, whether i.e., all combination patterns have been generated or not, in a step $P_{18}$. If the process has not been completed, then a next combination pattern is generated, the combined weight value is computed, and the operation after the step $P_8$ is repeated. If the process has been completed for all combinations, the arithmetic control unit 4 checks if the condition $K \geq 1$ is met or not in a step $P_{19}$. If the condition is met, then the arithmetic control unit 4 discharges the articles from those weighing units which are selected as giving an optimum article combination (which is the combination pattern stored in the step $P_{15}$) in a step $P_{21}$. If the condition $K \geq 1$ is not met, then the arithmetic conrol unit 4 determines that no optimum combination is obtained, and generates a failure signal in a step $P_{20}$.

(5) If a prescribed number or count is set in the step $P_4$, the arithmetic control unit 4 operates in a counting mode. The arithmetic control unit 4 sets the index K to 0 in a step $P_{22}$, reads the weight values Wi (i=1, ..., n) from the weighing units, and stores them in the memory 10 in a step $P_{23}$. Then, the arithmetic control unit 4 divides weight values from the weighing units by the unit weight Wu set by the unit weight setting unit 9 to produce article numbers or counts i for the respective weighing units in a step $P_{24}$.

(6) Then, the arithmetic control unit 4 generates a combination pattern under the control of the program stored in the program memory in the memory 10 in a step $P_{25}$, and processes the counts Ni according to the combination pattern to compute a combined count value Y in a step $P_{26}$. The arithmetic control unit 4 checks in a step $P_{27}$ if the combined count value Y is equal to the preset count Na or not. If not, then the arithmetic control unit 4 checks to determine if all combination patterns have been generated or not in a step $P_{28}$. If Y=Na, then the arithmetic control unit 4 executes the steps following the step $P_8$. Since Na is not 0 in the step $P_{16}$ (as the selected mode is the counting mode), the program goes to the step $P_{17}$.

(7) The arithmetic control unit 4 checks in the step $P_{17}$ to determine if K=L, where L is a certain number, such as 15 for example. When the combined count is equal to the preset count and a certain number (L) of combinations have been found with their combined weights between the upper and lower limits, it is not assured that a more accurate combination will be obtained even if further arithmetic operations are effected. Therefore, the number of acceptable combinations is limited to L. Then, the arithmetic control unit 4 checks to determine if the condition $K \geq 1$ is met in a step $P_{29}$. If the condition is met, then the discharge count j is counted up by 1 in a step $P_{30}$. The arithmetic control unit 4 ascertains if the discharge count j is a certain count, say 5, in a step $P_{31}$.

(8) If the discharge count j reaches the certain count, then the arithmetic control unit 4 divides the sum of H combined weight values X' stored in the step $P_{12}$ by the product of H and the preset count Na to produce a new unit weight Wu, and then updates the initial value with this new unit weight Wu in a step $P_{32}$. This updating process is effected after a number of consecutive discharging cycles for the reason that since the unit weight does not abruptly change even if it is not updated each time the counting-mode weighing process is completed, the accuracy remains substantially the same even if the unit weight is updated after a number of discharging cycles. Thereafter, the arithmetic control unit 4 sets the discharge count j to 0 in a step $P_{33}$ and discharges and supplies the articles in a step $P_{34}$. If the condition $K \geq 1$ is not met in the step $P_{29}$, then the arithmetic control unit 4 generates a failure signal in a step $P_{35}$ as no optimum combination is obtained.

Although a certain preferred embodiment has been shown and described, it should be understood that many changes and modifications may be made therein without departing from the scope of the appended claims.

What I claim is:
1. An automatic combinatorial weighing machine having weighing and counting modes, comprising:
   a plurality of weighing units for measuring the weights of supplied articles and issuing weight data corresponding to the measured weights;
   an arithmetic control unit, coupled to said plurality of weighing units and having a weighing mode and a counting mode, for effecting a combinatorial arithmetic operation on the weight data from said weighing units;
   a weight setting unit, coupled to said arithmetic control unit, for supplying a preset weight value to said arithmetic control unit;
   a number setting unit, coupled to said arithmetic control unit, for supplying a preset number of articles to said arithmetic control unit; and
   a unit weight setting unit, coupled to said arithmetic control unit, for supplying the average weight of one of the articles to said arithmetic control unit;
   said arithmetic control unit effecting the combinatorial arithmetic operation in the weighing mode when the preset number of articles set by said number setting unit is zero, and effecting the combinatorial arithmetic operation in the counting mode when the preset number of articles set by said number setting unit is other than zero.

2. An automatic combinatorial weighing machine according to claim 1, wherein when the preset number of articles set by said number setting unit is zero, said arithmetic control unit computes combined weigh tvalues based on the weight data, compares the combined weight values with the preset weight value set by said weight setting unit to select an optimum article combination, and discharges the articles from those weighing units wich give the selected optimum article combination.

3. An automatic combinatorial weighing machine according to claim 1, wherein when the preset number of articles set by said number setting unit is other than zero, said arithmetic control unit divides the weight data from said weighing units by the average weight of an article set by said unit weight setting unit to produce, for each of said weighing units, the number of articles per weighing unit, computes a combined number of articles based on the numbers of articles of the respective weighing units, compares the computed combined number of articles with the preset number of articles to select an optimum article combination, and discharges the articles from those weighing units which give the selected optimum article combination.

4. An automatic weighing machine according to claim 1, wherein when the preset number of articles set by said number setting unit is other than zero, said arithmetic control unit divides the weight data from said weighing units by the average weight of an article set by said unit weight setting unit to produce, for each of said weighing units, the number of articles per weighing unit, computes a combined number of articles based on the numbers of articles of the respective weighing units, computes combined weight values based on the weight data, selects an optimum article combination having a combined number of articles equal to the preset number of articles, and discharges the articles from those weighing units which give the selected optimum article combination, wherein the number of optimum article combinations having corresponding combined weight values within a predetermined range is limited to a predetermined number so as to limit the number of computations performed by said arithmetic control unit.

5. An automatic weighing machine according to claim 1, wherein when the preset number of articles set by said number setting unit is other than zero, said arithmetic control unit divides the weight data from said weighing units by the average weight of an article set by said unit weight setting unit to produce, for each of said weighing units, the number of articles per weighing unit, computes a combined number of articles based on the numbers of articles of the respective weighing units, compares the computed combined number of articles with the preset numbers of articles to select an optimum article combination, discharges the articles from those weighing units which give the selected optimum article combination, and updates the average weight stored in said unit weight setting unit each time the articles are discharged a prescribed number of time.

6. An automatic combinatorial measuring apparatus having a weighing mode and a counting mode, comprising:
means for providing a plurality of measured weight values respectively corresponding to the weights of a plurality of batches of articles;
second means for supplying a preset weight value;
third means for supplying a preset number of articles;
fourth means for supplying the average weight of one of the articles; and
an arithmetic control unit, coupled to said first, second, third and fourth means, for effecting a combinatorial arithmetic operation on the measured weight values, said arithmetic control unit including means for effecting the combinatorial arithmetic operation in the weighing mode when the preset number of articles has a predetermined value, and for effecting the combinatorial arithmetic operation in the counting mode when the preset number of articles is other than the predetermined value.

7. An automatic combinatorial measuring apparatus according to claim 6, wherein said arithmetic control unit computes combined weight values based on the measured weight values when the preset number of articles is the predetermiend value, compares the combined weight values with the preset weight value to select an optimum combination of the batches of articles, and discharges the batches of articles which form the selected optimum combination of batches.

8. An automatic combinatorial measuring apparatus according to claim 6, wherein said arithmetic control unit divides the measured weight value by the average weight of one article when the preset number of articles is other than the predetermined value to produce, for each of the batches of articles, the number of articles per batch, computes a combined number of articles based on the number of articles in the respective batches, compares the computed combined number of articles with the preset number of articles to select an optimum combination of batches, and discharges the batches of articles from the selected optimum combination of batches.

9. An automatic combinatorial measuring apparatus according to claim 6, wherein said arithmetic control unit divides the measured weight values by the average weight of one article when the preset number of articles is other than the predetermined value to produce, for each of the batches of articles, the number of articles per batch, computes a combined number of articles based on the number of articles in the respective batches, computes combined weight values based on the measured weight values, selects at least one optimum combination of batches having a combined number of articles equal to the preset number of articles, and discharges the batches of articles which form the selected optimum combination of batches, wherein the number of optimum combination of batches having combined weight values within a predetermined range is limited to a predetermined number, so that said arithmetic control unit computes the combined number of articles only until the predetermined number is reached.

10. An automatic combinatorial measuring apparatus according to claim 6, wherein said arithmetic control unit divides the measured weight values by the average weight of one article when the preset number of articles is other than the predetermined value to produce, for each of the batches of articles, the number of articles per batch, computes a combined number of articles based on the numbers of articles in the respective batches, compares the computed combined nubmer of articles with the preset number of articles to select an optimum combination of batches, discharges the batches which form the selected optimum combination of batches, and updates the average weight supplied by said fourth means each time the selected optimum combination of batches is discharged a predetermined number of times.

11. An automatic combinatorial measuring method for measuring batches of articles having respective measured weight values, comprising the steps of:
(a) supplying a preset weight value;
(b) supplying a preset number of articles;
(c) supplying the average weight of one of the articles;
(d) performing a combinatorial arithmetic operation in accordance with one of a weighing mode and a counting mode in dependence upon the preset number of articles, the combinatorial arithmetic operation being performed in the weighing mode when the preset number of articles is a predetermined value, the combinatorial arithmetic operation being performed in the counting mode when the preset number of articles is other than the predetermined value.

12. An automatic combinatorial measuring method according to claim 11, wherein when the preset number of articles is the predetermined value, said step (d) comprises the substeps of:
 (d1) computing combined weight values based on the measured weight values;
 (d2) comparing the combined weight values with the preset weight value to select an optimum combination of batches; and
 (d3) discharging the batches which form the selected optimum combination of batches.

13. An automatic combinatorial measuring method according to claim 11, wherein when the preset number of articles is other than the predetermined value, said step (d) comprises the substeps of:
 (d1) dividing the measured weight values by the average weight of one article to produce, for each of the batches of articles, the number of articles per batch;
 (d2) computing a combined number of articles based on the number of articles of the respective batches;
 (d3) comparing the computed combined number of articles with the preset number of articles to select an optimum combination of batches; and
 (d4) discharging the batches which form the selected optimum combination of batches.

14. An automatic combinatorial measuring method according to claim 13, further comprising the step of updating the average weight of one article after said discharge step (d4) has taken place a predetermined number of times.

15. An automatic combinatorial measuring method according to claim 11, wherein when the preset number of articles is other than the predetermined value, said step (d) comprises the substeps of:
 (d1) dividing the measured weight values by the average weight of one article to produce, for each of the batches, the number of articles per batch;
 (d2) performing the following substeps for combinations of the batches of articles;
 (d2') computing a combined number of articles for one of the combinations of batches;
 (d2'') determining whether the combined number of articles is equal to the preset number of articles;
 (d2''') computing a combined weight value based on the measured weight values for the combination of batches if it is determined that the combined number of articles is equal to the preset number of articles;
 (d2'''') determining whether the combined weight value is acceptable;
 (d2''''') determining whether the number of acceptable combinations exceeds a predetermined number, returning to substep (d2') if all possible combined number of articles have not been computed and the number of acceptable combinations is less than the predetermined number, and proceeding to substep (d3) if the number of acceptable combinations is greater than or equal to the predetermined number;
 (d3) selecting an optimum combination of batches having a combined number of articles equal to the preset number of articles and having an acceptable combined weight value;
 (d4) discharging the batches which form the selected optimum combination of batches.

16. An automatic combinatorial measuring method according to claim 15, further comprising the step of updating the average weight of one article after said discharge step d4 has taken place a predetermined number of times.

* * * * *

UNITED STATES PATENT AND TRADEMARK OFFICE
CERTIFICATE OF CORRECTION

PATENT NO. : 4,645,020

DATED : February 24, 1987

INVENTOR(S) : Haze

It is certified that error appears in the above-identified patent and that said Letters Patent is hereby corrected as shown below:

```
Column 1, line 31, "discharegd" should be --discharged--;
          line 52, "assigne" should be --assignee--.
Column 3, line 41, "Wl" should be --Wℓ --.
Column 4, line 8,  "Wl" should be --Wℓ --;
          line 65, "Wl" should be --Wℓ --;
and "where is" should be --where Wp is--;
          line 66, delete "Wp"; and "Wl" should be --Wℓ --.
Column 5, line 12, "unit " should be --unit 4--;
                    4
          line 20, "whether i.e.," should be --i.e., whether--;
          line 33, "conrol" should be --control--.
Column 6, line 60, "weigh tval-" should be --weight val- --;
          line 65, "wich" should be --which--.
Column 8, line 50, "nubmer" should be --number--.
Column 10,line 22, "nubmer" should be numbers--;
          line 37, "d4" should be --(d4)--.
```

Signed and Sealed this

Eleventh Day of August, 1987

Attest:

DONALD J. QUIGG

Attesting Officer

Commissioner of Patents and Trademarks